Aug. 10, 1937.　　　J. J. PUNKE　　　2,089,424
HEAD LAMP CONSTRUCTION
Filed Nov. 13, 1933　　　2 Sheets-Sheet 2
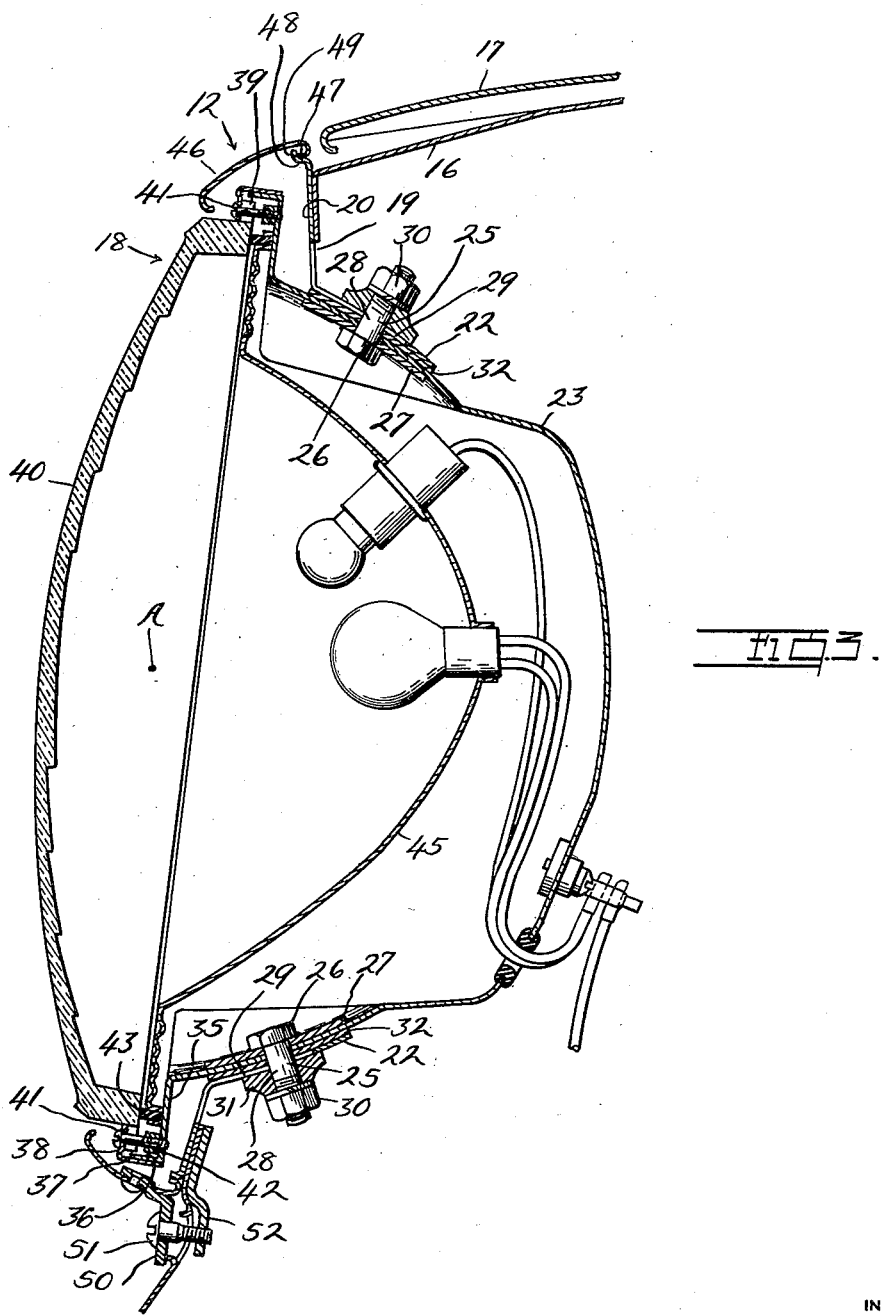
INVENTOR
John J. Punke Patented Aug. 10, 1937

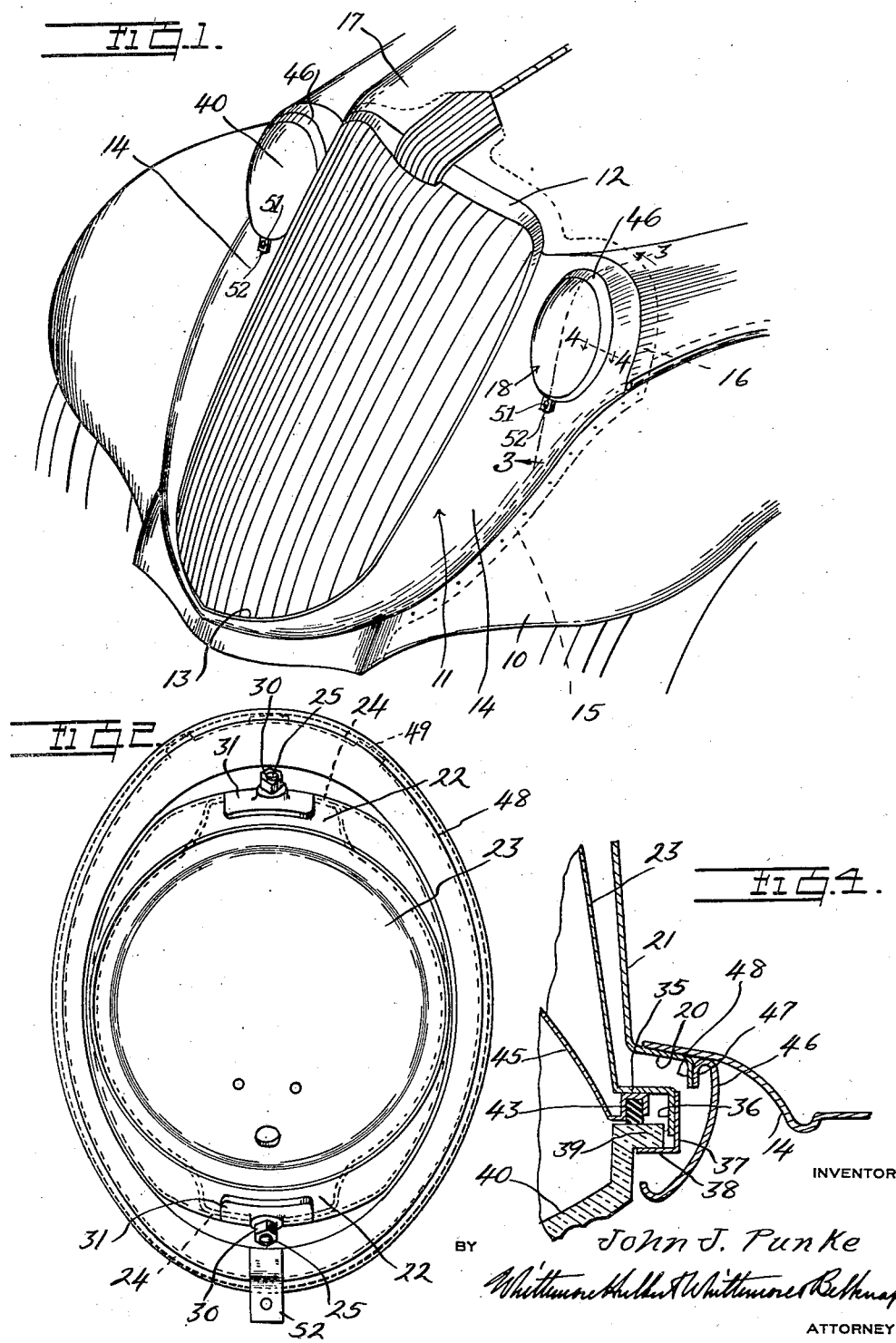

2,089,424

UNITED STATES PATENT OFFICE

2,089,424

HEAD LAMP CONSTRUCTION

John J. Punke, Detroit, Mich., assignor to Hupp Motor Car Corporation, Detroit, Mich., a corporation of Virginia Application November 13, 1933, Serial No. 697,822

7 Claims. (Cl. 240—8.11)

This invention relates generally to motor vehicles and refers more particularly to improved means for supporting head lamps on motor vehicles.

One of the principal objects of this invention is to facilitate assembly of the head lamps on the vehicle and at the same time reduce the cost of manufacture to a minimum.

More specifically, the present invention contemplates a combined head lamp mounting and front end construction wherein the lamps are supported in wing sections extending laterally from opposite sides of the radiator shell portion and wherein the hood for the engine compartment extends over the wing portions to the fenders concealing the head lamp casings. This construction provides for reducing the cost of manufacture since only the bezels and lenses of the lamps are visible, rendering it unnecessary to apply a high finish on the head lamp casings.

Another advantageous feature of this invention resides in the novel means employed for mounting the lamps on the wing sections which is not only simple, but at the same time provides for obtaining the necessary adjustment of the lamps to impart the desired tilt to the light beams.

A further object of this invention resides in the provision of a construction which not only permits the head lamps to be assembled with the wing portions from the front side thereof, but, in addition permits removal of the bezels and associated lenses from the front sides of the lamp casings or wing sections. This arrangement is especially desirable from a service standpoint since it provides for interchanging the lamps and reflectors in the casings without disturbing the latter or lifting the hood of the motor compartment.

The novel construction rendering the foregoing advantageous features possible will be more fully hereinafter described in connection with the accompanying drawings wherein:

Figure 1 is a fragmentary perspective view of the front portion of a motor vehicle embodying this invention;

Figure 2 is an enlarged rear elevation of a portion of one of the wing sections showing a headlight in assembled relation therewith;

Figure 3 is a sectional view taken on the line 3—3 of Figure 1;

Figure 4 is a sectional view taken on the line 4—4 of Figure 1.

Referring now to the drawings it will be noted that I have illustrated in Figure 1 the front end portion of a motor vehicle having fenders 10 disposed upon opposite sides thereof and having a stamping 11 interposed between said fenders. The stamping 11 is provided with a shell portion 12 apertured as at 13 opposite the radiator core (now shown) to provide for the passage of air through the latter and having wing portions 14 extending laterally outwardly from opposite sides of the shell portion. The outer edges of the wing portions are flanged as at 15 for attachment to the fenders 10 through the skirts on the latter and the upper edges of the wing portions are provided with rearwardly extending flanges 16, cooperating with a similar flange on the shell portion to form a continuous seat for the forward end portion of the hood 17. As indicated in Figure 1 the lower edges of the side walls of the hood normally seat upon the fenders 10 so that the fender skirts and wing portions cooperate with the hood in closing the engine compartment.

It will also be noted from Figure 1 of the drawings that the wing portions not only form with the shell portion a structural tie between the fenders, but also serve to support the headlights 18 of the vehicle upon opposite sides of the shell portion. In detail, each of the wing portions is formed with an opening 19 therethrough and a suitable annular frame 20 is spot-welded or otherwise suitably secured to the front face of each of the wing portions in the manner clearly shown in Figure 3. The inner edge of each annular frame 20 is provided with a flange 21 extending rearwardly through the opening 19 in each of the wings and having diametrically opposed top and bottom portions 22 offset inwardly with respect to the center of the annular frames to form seats for the head lamp casings 23. The bearing surfaces of the offset portions 22 of each frame member 20 have a common radius struck from a center (A) located substantially on the center lines of the lamp casings in advance of the normal plane of the stamping. With the above construction it will be seen that the offset bearing surfaces 22 on each frame member are somewhat spherical, and in order to provide for engaging the lamp casings 23 with the bearing surfaces, the former are outwardly offset, as shown in Figure 2, to form corresponding bearing surfaces 24. The bearing surfaces 24 have substantially the same curvature as the surfaces 22 in order to insure proper positioning of the lamp casings within the wing portions and, at the same time permit the required adjustment of the lamp casings to obtain the desired beam angle.

The lamp casings are secured within the openings 19 of the wing portions by means of suitable bolts 25 having the head portions 26 permanently fixed to suitable washers 27 which, in turn, are suitably welded to the inner surfaces of the bearing portions of the casings, and the latter are apertured to permit the shank portions 28 of the bolts to extend therethrough. The shanks 28 of the bolts, in addition to extending through the lamp casings, also project through slots 29 formed in the bearing surfaces 22 of the frame members 20. The slots 29 are elongated in the direction of the width of the bearing portions 22 and thereby provide for adjusting the lamp casings relative to the wing portions in order to secure the desired beam angle. The lamp casings are secured in any one of their adjusted positions by means of nuts 30 threaded upon the extremities of the bolts and exerting their clamping action through the medium of suitable washers 31. In actual practice spacers 32 of suitable material such as graphite bronze may be interposed between the bearing surfaces on the lamp casings and the bearing surfaces on the frame members 20 so as to eliminate squeaks and other objectionable noises.

The forward ends of the lamp casings 23 extend beyond the front sides of the frames 20 and are provided with outwardly extending flanges 35 terminating in annular flanges 36. Sleeved upon the aforesaid annular flanges 36 are suitable rings 37 having inwardly extending flanges 38 at the forward ends thereof adapted to engage the front sides of marginal flanges 39 formed on the lenses 40 of the head lamps. The marginal flanges 39 are slotted at diametrically opposite sides of the lenses to provide for extending the fastener elements 41 therethrough. The fastener elements 41 are carried by the rings 37 and the shank portions are adapted to be threaded within suitable grommets 42 fixed to the flange 35 on the casing. The construction is such that the rings 37 and associated fastener elements 41 serve to removably secure the headlight lenses to the casings. As shown in Figure 3 the lenses 40 are clamped to the flanges 35 on the casings through the medium of semi-flexible rings 43 interposed between the lenses and flanges 35. The rings 43 are carried by the peripheral flanges on the light reflector 45 and as a consequence the latter are also secured within the lamp casings by the fastening means for the lenses 40.

In order to impart a finished appearance to the construction I provide means for concealing the portion of the lamp assemblies projecting forwardly beyond the wing portions 14. In the present instance the aforesaid means comprises bezels 46 having return bent flanges 47 on the rear side thereof adapted to seat upon flanges 48 extending forwardly from the peripheries of the annular frame members 20. The bezels are held in assembled relation with the frame members 20 by providing spaced upwardly extending lugs 49 on the flanges 48 of the frame members 20 at the upper ends of the latter for engaging the ends of the return-bent flanges 47 on the bezels. Suitable brackets 50 are permanently secured to the lower portions of the bezels in the manner shown in Figure 3 and these brackets are removably secured to the frame members 20 by fastener elements 51. The fastener elements are carried by the brackets and are threaded for engagement with suitable reenforcing members 52 fixed to the inner sides of the frame members 20. With the above construction the bezels may be readily removed by merely disengaging the fastener elements 51 from the reenforcing members 52 on the frames 20 and moving the lower portions of the bezels forwardly to disengage the corresponding portions of the return-bent flanges 47 thereon from the flanges 48, whereupon the bezels may be displaced upwardly the distance required to clear the lugs 49.

By reason of the above construction it will be seen that the head lamp casings with the lenses and associated parts may be assembled as a unit with the wing portions 14 from the front sides of the latter by merely inserting the lamp casings 23 into the openings 19 in the frame members 20 until the bearing surfaces 22 on the latter engage the corresponding bearing surfaces 24 on the former. The lamp casings may then be properly adjusted to secure the desired beam angle and, thereafter secured in their adjusted position by the fastener elements 25. After the lamp casings have been properly assembled with the wing portions the bezels are secured in place in the manner clearly set forth above to impart a finished appearance to the construction. It will also be apparent from the foregoing construction that the lenses of the lamps may be readily removed by merely detaching the bezels and loosening the fastener elements 41. Due to the simplicity of the means employed for fastening both the bezels and lenses in assembled position the removal of these parts may be effected readily and with the least possible effort. It will further be observed from the preceding description that the major portions of the lamp casings are concealed by the hood 17 of the motor compartment and as a consequence it is not necessary to finish the casings, with the result, that the cost of manufacture of the lamp casings is materially reduced.

What I claim as my invention is:

1. In a front end construction for motor vehicles, a front section having an opening therethrough, a lamp casing extending into the opening, a frame member having a portion located in advance of the section and having another portion projecting rearwardly through the opening in the section, means for attaching the lamp casing to the second named portion of the frame member and a bezel surrounding the portion of the lamp casing extending forwardly from the front section and secured to the first named portion of the frame member.

2. In a front end construction for motor vehicles, a front section extending transversely of the vehicle and having an opening therethrough, a lamp casing extending into the opening and having spaced arcuate portions, flanges extending rearwardly from the marginal edge portions of the opening in the front section and having correspondingly curved portions forming seats for the arcuate portions of the lamp casing, and means securing the lamp casing to the front section permitting the former to be rocked about the curved seats on the latter.

3. In a front end construction for motor vehicles, a front section extending transversely of the vehicle and having an opening therethrough, a lamp casing extending into the opening and having diametrically opposed upper and lower portions curved about a common radius struck from a predetermined point, correspondingly curved portions on the front section forming seats for the curved portions aforesaid on the casing and also having a common radius struck from said predetermined point, and means adjustably securing the lamp casing to the front section permitting the casing to be rocked on the curved seats of the front section about the predetermined point aforesaid.

4. In a front end construction for motor vehicles, a front section extending transversely of the vehicle and having an opening therethrough, a lamp casing extending into the opening and having diametrically opposed upper and lower portions curved on a common radius struck from a point substantially on the center line of the lamp casing and located in advance of the normal plane of the front section, flange portions extending rearwardly from the front section curved on the same radius as the portions of the lamp casing aforesaid and forming seats for said portions, means securing the lamp casing to the front section in rear of the latter permitting the curved portions of the casing to be rocked on the seats about the point aforesaid, and a bezel encircling the portion of the lamp casing in advance of the front section and secured to the latter.

5. In a front end construction for motor vehicles having a headlamp casing housing a reflector and having a bezel at the forward end thereof, a rigid mounting for the lamp on the vehicle comprising, a fixed part having spherical seats spaced upon opposite sides of the longitudinal axis of the casing and having a common center located substantially on said axis, corresponding spherical portions on the lamp casing supported on the spherical seats for oscillation relative thereto substantially about the common center, means adjustably securing the spherical portions on the lamp casing to the spherical seats, and means for independently securing the bezel on the fixed part of the front end construction.

6. In a front end construction for motor vehicles having a fixed front section and having a headlamp provided with a part extending through an opening in said section, a rigid mounting for the lamp on the front section comprising, spherical seats carried by the front section in rear of the latter and having a common center located on the horizontal axis of the lamp casing, said seats being positioned above and below the lamp casing, corresponding spherical portions on the part aforesaid of the lamp supported on the seats for oscillation relative thereto about the common center aforesaid, and adjustable means separately and rigidly securing each spherical portion on said lamp part and its corresponding spherical seat on said front section together.

7. In a front end construction for motor vehicles having a fixed front section and having a headlamp provided with a casing extending through an opening in the front section and provided with a bezel at the forward end thereof, a rigid mounting for the headlamp on the front section comprising a spherical seat carried by the front section in rear of the latter and having its center located substantially on the horizontal axis of the casing, a corresponding spherical portion on the lamp casing engageable with the spherical seat for oscillation relative thereto substantially about the center aforesaid, means securing the spherical portion on the headlamp casing to the spherical seat on the front section, and means for securing the bezel to the front section in advance of the latter.

JOHN J. PUNKE.